US009003617B2

(12) United States Patent
Walker et al.

(10) Patent No.: US 9,003,617 B2
(45) Date of Patent: Apr. 14, 2015

(54) MULTI-CHAMBER CARABINER

(75) Inventors: Benjamin Walker, Draper, UT (US);
Paul Oddou, Salt Lake City, UT (US);
Bill Belcourt, Salt Lake City, UT (US);
Paul Terry, Park City, UT (US)

(73) Assignee: Black Diamond Equipment Ltd., Salt Lake City, UT (US)

( * ) Notice: Subject to any disclaimer, the term of this patent is extended or adjusted under 35 U.S.C. 154(b) by 366 days.

(21) Appl. No.: 12/636,055

(22) Filed: Dec. 11, 2009

(65) Prior Publication Data

US 2011/0138587 A1    Jun. 16, 2011

(51) Int. Cl.
*F16B 45/02*    (2006.01)

(52) U.S. Cl.
CPC ............. *F16B 45/02* (2013.01); *Y10T 24/4534* (2015.01); *Y10T 24/45335* (2015.01); *Y10T 24/45356* (2015.01); *Y10S 24/35* (2013.01)

(58) Field of Classification Search
CPC .................. Y10T 24/45199; Y10T 24/45319; Y10T 24/4534; Y10T 24/45356; Y10T 24/45372; F16B 45/02
USPC .......... 24/598.2, 599.1, 599.4–600.2, 116 R, 24/371, 375, 376, 577.1, 582.1–582.14; 59/88, 89; 294/82.19; 152/241, 242
See application file for complete search history.

(56) References Cited

U.S. PATENT DOCUMENTS

| 482,885 | A | * | 9/1892 | Wallace | ........................ 24/599.1 |
| 3,949,451 | A | * | 4/1976 | Bunn | ........................... 24/599.4 |
| 4,811,467 | A | | 3/1989 | Lowe | |
| 4,819,304 | A | | 4/1989 | Engers | |
| 4,930,194 | A | | 6/1990 | Frechin | |
| 4,977,647 | A | | 12/1990 | Casebolt | |
| 5,187,844 | A | | 2/1993 | Simond | |

(Continued)

FOREIGN PATENT DOCUMENTS

| CA | 987075 | | 4/1976 |
| DE | 10239755 A1 | * | 3/2004 |

(Continued)

OTHER PUBLICATIONS

Application and File History for U.S. Appl. No. 13/302,188, filed Nov. 22, 2011. Inventors: Schwappach et al., which is a continuation of U.S. Appl. No. 12/321,929, filed Jan. 27, 2009.

(Continued)

*Primary Examiner* — Robert J Sandy
*Assistant Examiner* — Rowland Do
(74) *Attorney, Agent, or Firm* — Trent Baker; Baker & Associates PLLC

(57) ABSTRACT

An automatically locking carabiner system including a frame, a gate, a gate biasing system, and a gate locking system. The frame and gate form a continuously enclosed inner region in a closed configuration with respect to the frame. When in an engaged state, the gate locking system is configured to automatically lock the gate in the closed configuration with respect to the frame. The gate locking system may include a trigger coupled to the frame such that the position of the trigger corresponds to the state of the gate locking system. The trigger may be positioned on an opposite side of the frame from the gate with respect to the inner region. The force required to disengage the gate locking system may be substantially opposite that which is required to transition the gate to the open configuration with respect to the frame.

13 Claims, 7 Drawing Sheets

(56) References Cited

U.S. PATENT DOCUMENTS

| | | |
|---|---|---|
| 5,357,657 A | 10/1994 | Petzel |
| 5,384,943 A * | 1/1995 | LeFebvre et al. ............ 24/600.1 |
| 5,463,798 A | 11/1995 | Wurzer |
| 5,608,953 A | 3/1997 | Petzel |
| 5,664,304 A * | 9/1997 | Tambornino ................ 24/599.1 |
| 5,791,025 A | 8/1998 | Petzel |
| 5,940,943 A | 8/1999 | Kloster |
| 6,308,385 B1 * | 10/2001 | Ball ............................ 24/574.1 |
| D467,156 S | 12/2002 | Bishop |
| 6,588,076 B1 | 7/2003 | Choate |
| 6,601,274 B2 * | 8/2003 | Gartsbeyn ................... 24/599.8 |
| 7,228,601 B2 * | 6/2007 | Thompson ................... 24/599.9 |
| D550,552 S | 9/2007 | Oas |
| 7,320,159 B2 | 1/2008 | Petzel |
| D588,433 S | 3/2009 | Deursen |
| 2002/0050032 A1 | 5/2002 | Carnall |
| 2002/0073520 A1 | 6/2002 | Hall |
| 2005/0011058 A1 | 1/2005 | Simond |
| 2005/0172461 A1 | 8/2005 | Hall |
| 2005/0193531 A1 * | 9/2005 | Chang ......................... 24/600.2 |
| 2005/0229367 A1 | 10/2005 | Thompson |
| 2007/0186393 A1 | 8/2007 | Thompson |

FOREIGN PATENT DOCUMENTS

| | | |
|---|---|---|
| JP | 2002235725 A * | 8/2002 |
| JP | 2008232154 A * | 10/2008 |
| WO | WO2004020846 | 3/2004 |

OTHER PUBLICATIONS

EDELRID Galaxy Carabiner—Website page from catalog attached, Prior Art.

DMM Belay Master Carabiner—Website page provided, Prior Art.

Simond Goliath Carabiner—Website page provided, Prior Art.

* cited by examiner

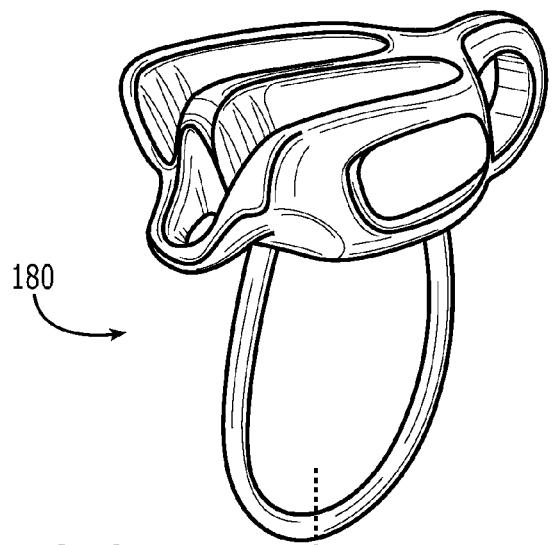
FIG. 2
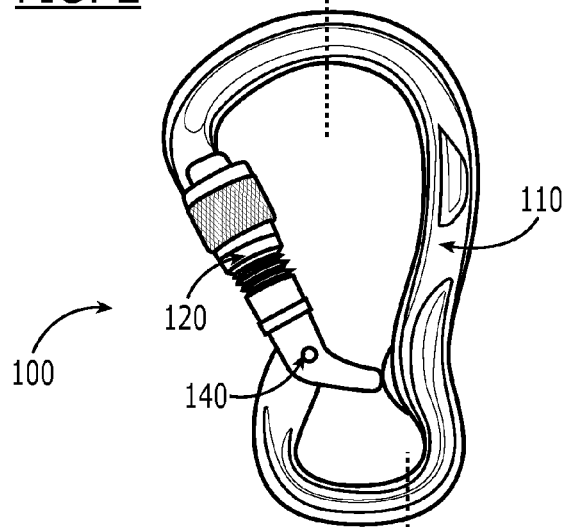
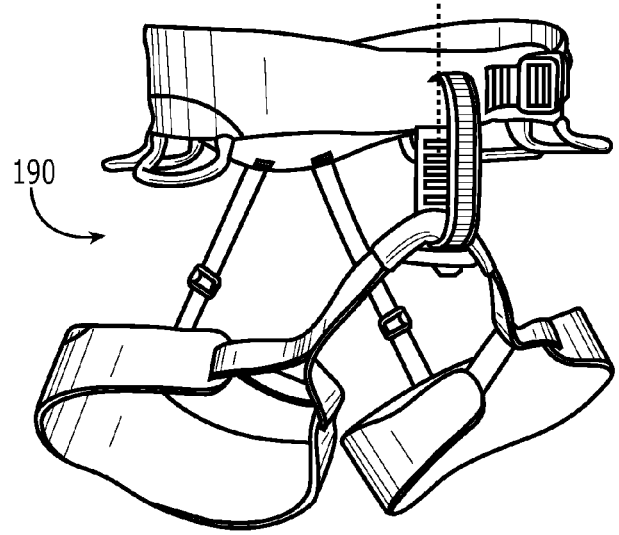

MULTI-CHAMBER CARABINER

FIELD OF THE INVENTION

The invention generally relates to mechanical coupling mechanisms such as carabiners and snap-hooks. In particular, the invention relates to an improved multi-chamber carabiner.

BACKGROUND OF THE INVENTION

Carabiners, snap-hooks, and releasable clamps are used in a variety of applications for releasably coupling objects to one another. For example, a rock climber may use one or more carabiners to releasably secure a rope to a protection device during vertical ascension. Carabiners generally include a frame, a gate, and a releasable gate closure mechanism. The gate is configured to releasably engage the frame, so as to form a continuous inner region which can be used to mechanically couple to one or more objects. The releasable gate closure mechanism is configured to allow the gate to be selectively pivoted with respect to the frame to facilitate adding or removing items from the continuous inner region. The releasable gate closure mechanism simultaneously biases the gate toward a closed configuration with respect to the frame, so as to maintain mechanical coupling of items within the continuous inner region. A wide variety of frame, gate, and biasing systems exist to specifically accommodate particular applications and/or manufacturing costs for the carabiner.

Various specialized carabiners are designed for particular applications. One type of specialized carabiner is configured for use between a belayer and a belay device during a roped rock climbing event. This particular type of carabiner is commonly referred to as a "belay carabiner" and may include one or more conventional features to optimize performance for belay purposes. These features include a respectively large enclosed region and a locking gate mechanism. The large enclosed region minimizes gate obstructions occurring as a result of coupling alternative types of belay devices to a harness. The locking mechanism locks the gate in a closed configuration to prevent inadvertent opening with respect to the frame. Various other specialized carabiner features may be included on a belay carabiner for particular benefits. For example, conventional belay carabiners include multiple gates and multiple independent enclosed regions to enable specialized rope-friction functionality. For example, conventional belay carabiners may include parallel enclosed regions with independent gates oriented outward for purposes of providing the user with an additional rappel rope friction generating system.

Various problems exist with conventional belay carabiners. One common dangerous scenario that may occur during use of a belay carabiner is referred to as "cross-loading". Cross-loading occurs when a carabiner is loaded from a non-lengthwise orientation and/or rotates from a lengthwise parallel orientation to a lengthwise perpendicular orientation with respect to the harness of a user. The enclosed region of a carabiner has the highest tensile strength when the gate is in the closed configuration and the tensile forces are oriented along the longest axis. A carabiner may become rotationally misaligned during the course of a belay as a result of belay operation or carabiner rotation. The rotational misalignment of the carabiner may then expose the carabiner to a potential cross-loading scenario in which the carabiner is likely to receive non-lengthwise oriented tensile force. Various conventional carabiner designs have attempted to prevent the cross-loading scenario by restricting the rotational freedom of the belay carabiner once it is properly attached to the user. Unfortunately, conventional carabiner designs have been ineffective and/or inefficient by requiring complex multi-step belay-configuration engagement/disengagement processes, poor durability, and/or awkward operation.

Therefore, there is a need in the industry for a carabiner design that minimizes cross-loading belay scenarios, provides long term durability, and overcomes the limitations of existing systems in a cost efficient manner.

SUMMARY OF THE INVENTION

The present invention relates to mechanical coupling mechanisms such as carabiners and snap-hooks. One embodiment of the present invention relates to a multi-chamber carabiner configured for use as a belay carabiner, including a frame and a gate. The carabiner further includes a closed configuration in which the gate and frame form at least one enclosed region and an open configuration in which the gate is pivotably rotated within the at least one enclosed region to form a first opening. A gate biasing system is coupled to the frame and gate for purposes of mechanically biasing the gate toward the closed configuration with respect to the frame. The frame may include both a primary opening and a secondary opening, and the gate may include both a primary portion and a secondary portion. The primary portion of the gate may extend from the pivot location across the primary opening of the frame in the closed configuration, and the secondary portion may also extend from the pivot location across the secondary opening of the frame in the closed configuration. A second embodiment of the present invention may replace the secondary gate portion with a secondary gate that operates independently of the gate with respect to the frame. A third embodiment of the present invention relates to a method for engaging a carabiner with a harness for rock climbing activities including the acts of inserting the carabiner through both the primary and secondary openings.

Embodiments of the present invention represent a significant advance in the field over conventional locking, multi-chamber, and belay type carabiners. Configuring the frame to include both a primary and secondary opening for purposes of separating the harness attachment point from the belay device attach point reliably prevents cross-loading during operation. The optional operational dependence between the primary and secondary gates or gate portions enables a user to efficiently translate the harness attachment point (i.e. belay loop) to the internal secondary enclosed region. Likewise, the optional positioning/configuration of the secondary enclosed region and secondary opening within the enclosed region facilitates an improved engagement of the harness attachment point to the secondary enclosed region. In addition, the common pivot point of the primary and secondary gates/gate portions facilitates the use of the same gate biasing mechanism and/or an automatic operational dependence between the gates/gate portions.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. The Figures presented in conjunction with this description are views of only particular—rather than complete—portions of the systems and methods of making and using the system according to the invention. In the Figures, the physical dimensions may be exaggerated for clarity.

FIG. 2 illustrates an operational schematic of the multi-chamber carabiner system of FIG. 1 with reference to a belay device and a harness in accordance with a method embodiment of the present invention;

DETAILED DESCRIPTION OF THE INVENTION

Figure 1A:
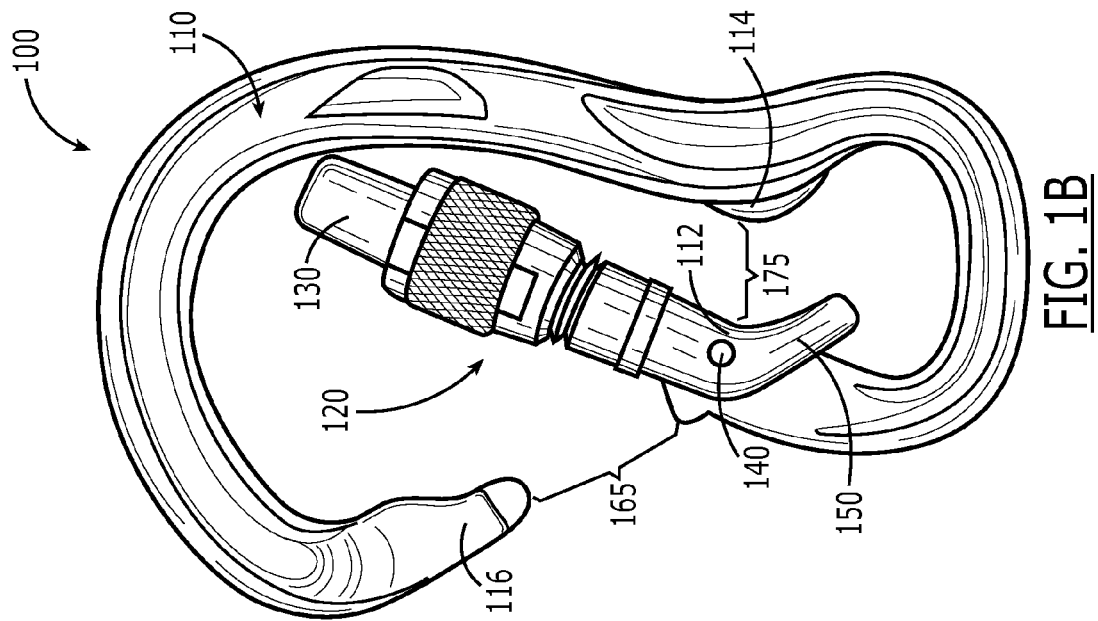
FIGS. 1A and 1B illustrate profile assembled views of a multi-chamber carabiner system with a gate in a closed and open configuration, respectively, in accordance with one embodiment of the present invention.

The present invention relates to mechanical coupling mechanisms such as carabiners and snap-hooks. One embodiment of the present invention relates to a multi-chamber carabiner configured for use as a belay carabiner including a frame and a gate. The carabiner further includes a closed configuration in which the gate and frame form at least one enclosed region and an open configuration in which the gate is pivotably rotated within the at least one enclosed region to form a first opening. A gate biasing system is coupled to the frame and gate for purposes of mechanically biasing the gate toward the closed configuration with respect to the frame. The frame may include both a primary opening and a secondary opening and the gate may include both a primary portion and a secondary portion. The primary portion of the gate may extend from the pivot location across the primary opening of the frame in the closed configuration and the secondary portion may also extend from the pivot location across the secondary opening of the frame in the closed configuration. A second embodiment of the present invention may replace the secondary gate portion with a secondary gate that operates independently of the gate with respect to the frame. A third embodiment of the present invention relates to a method for engaging a carabiner with a harness for rock climbing activities including the acts of inserting the carabiner through both the primary and secondary openings. While embodiments of present invention are described in reference to a multi-chamber carabiner system, it will be appreciated that the teachings of present invention are applicable to other areas such as other types of carabiners and snap-hooks.

The following terms are defined as follows:

Operably dependent/independent—an operational dependence or independence between two components. Components which are operationally dependent are configured to automatically operate simultaneously. For example, when one lengthwise side of a teeter totter is lowered, the opposite side is automatically raised, meaning the two lengthwise sides are operationally dependent. Components which are operationally independent will not necessarily operate simultaneous to one another. For example, the keys on a piano may be played individually without activating the adjacent or remaining keys.

Pivotably coupled—components which are coupled in a manner that facilitates a pivot type movement therebetween. For example, a door is pivotably coupled to a door frame to facilitate pivotal rotation about the door frame.

Enclosed region—a region which is geometrically contained within a perimeter. The enclosed region may be a two or three dimensionally enclosed region depending on the structure forming the perimeter. For example, all carabiners form some type of two dimensional enclosed region when the gate and frame are positioned in the closed configuration. The enclosed region is only two dimensional in that the enclosed region may be used to couple or attach components.

Biasing—defaulting or urging a component toward a particular configuration. For example, a rubber band is biased toward a particular circumference; this means that if it is stretched and released, it will return to the biased circumference. A second example may include a public restroom door that is biased toward a closed configuration; it may be opened, but upon release it automatically returns to the closed configuration. A third example may include an elevator that is biased towards the first floor of a building; the elevator may be engaged to transfer to a particular floor, but upon completion it will automatically return to the first floor.

Carabiner—a mechanical device including a frame, a gate, and an inner region defined between the frame and gate. The gate is biased toward a closed configuration in which the inner region is continuous with regards to being enclosed by the frame and gate. In response to a particular force, the gate is configured to pivot with respect to the frame to create an opening of the inner region, thereby forming an open configuration.

Gate biasing system—a system of components configured to bias the gate of a carabiner toward a particular configuration.

Gate locking system—a system of components configured to lock or fix the gate of a carabiner in a closed configuration with respect to the frame. The system may include an engaged/locked state and a disengaged/released state. A gate locking system is selectively releasable in response to a particular force so as to disengage/release the gate locking system to enable the gate to function normally. The force required to disengage or engage the gate locking system is generally independent of that which is required to pivot the gate of a carabiner. A gate locking system may be biased towards an engaged or disengaged state.

Lengthwise—an orientation for measurement referring to the longest dimension of a mechanical component.

Figure 1B:
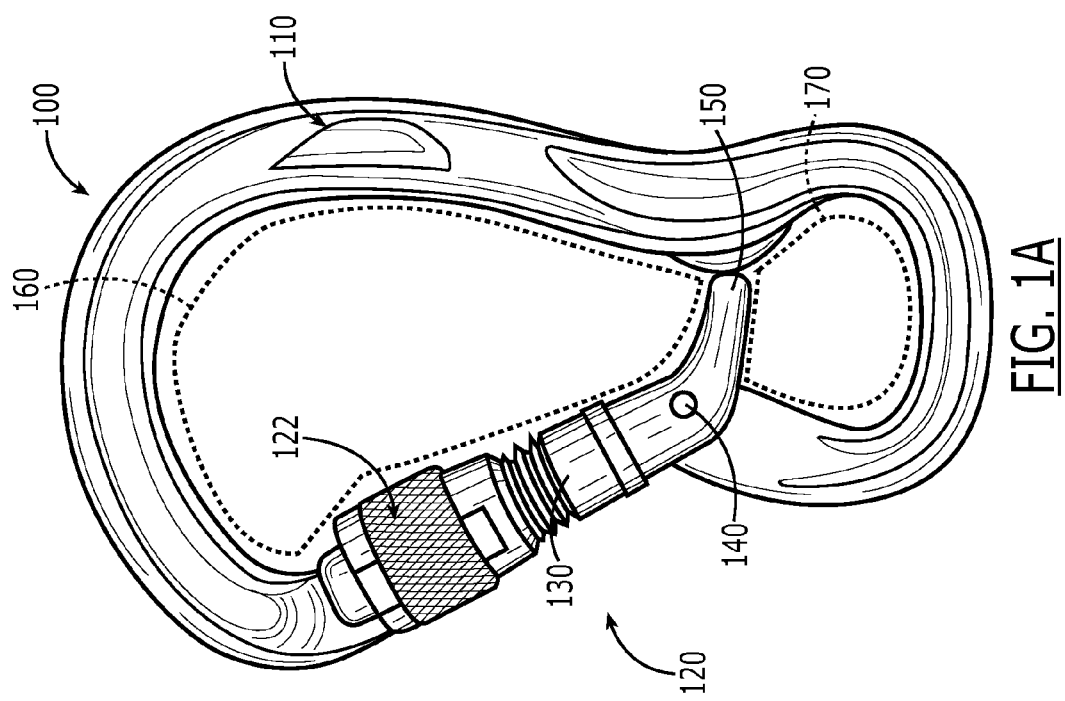

Reference is made to FIGS. 1A, 1B, 3, and 4 which illustrate various views of a multi-chamber carabiner system, designated generally at 100. The system 100 includes a frame 110, a gate 120, a primary inner region 160, and a secondary inner region 170. The gate 120 is pivotably coupled to the frame about a pivot point 140. The frame 110 forms a substantial two dimensional enclosure of the primary and secondary inner regions 160, 170. FIG. 1A illustrates the gate 120 and frame 110 in a closed configuration such that the primary and secondary inner regions 160, 170 are continuously enclosed within the gate 120 and frame 110. FIG. 1B illustrates the gate 120 and frame 110 in an open configuration such that the gate 120 is pivoted about the pivot point 140 substantially within the primary inner region 160. A gate biasing system (not designated) biases the gate 120 toward the closed configuration with respect to the frame 110. Various well known gate biasing systems may be used, including but not limited to those composed of springs, compliant materials, etc. The frame 110 forms the supportive structure of the system 100 and is shaped in a substantially concave manner with the respect to the gate 120. The exact curvature, shape, and composition of the frame 110 may be adjusted to modulate various other carabiner related performance aspects without affecting the teachings of the present invention.

The frame 110 further includes a primary opening 165 and a secondary opening 175. The gate 120 also further includes a primary portion 130 and a secondary portion 150. The primary portion 130 of the gate 120 extends from the pivot point 140 across the primary opening 165 of the frame 110 in the closed configuration. Likewise, the secondary portion 150 of the gate 120 extends from the pivot point 140 across the secondary opening 175 of the frame 110 in the closed configuration. The primary opening 165 extends between the nose 116 and pivot point 140 of the frame and is disposed across a perimeter region of the frame 110 such that it provides external access to the two dimensional primary enclosed region 160. The secondary opening 175 is located between a first and second point of concavity 112, 114 on the frame and is disposed across an interior region of the frame 110 such that it provides internal access to the separated secondary enclosed region 170 from the primary enclosed region 160. It will be appreciated that the exact shape of the frame 110 and gate 120 may be adjusted to adjust the size and performance characteristics of the openings 165, 175 and enclosed regions 160, 170. Although illustrated as a single component, it will be appreciated that alternative embodiments may include separate primary and secondary gate portions 130, 150 composed of independent materials. For example, the secondary gate portion 150 may be composed of a plastic based material while the primary gate portion 130 is composed of a metal based material. Some of the alternative embodiments are described and illustrated with reference to FIGS. 5-6.

Figure 3:
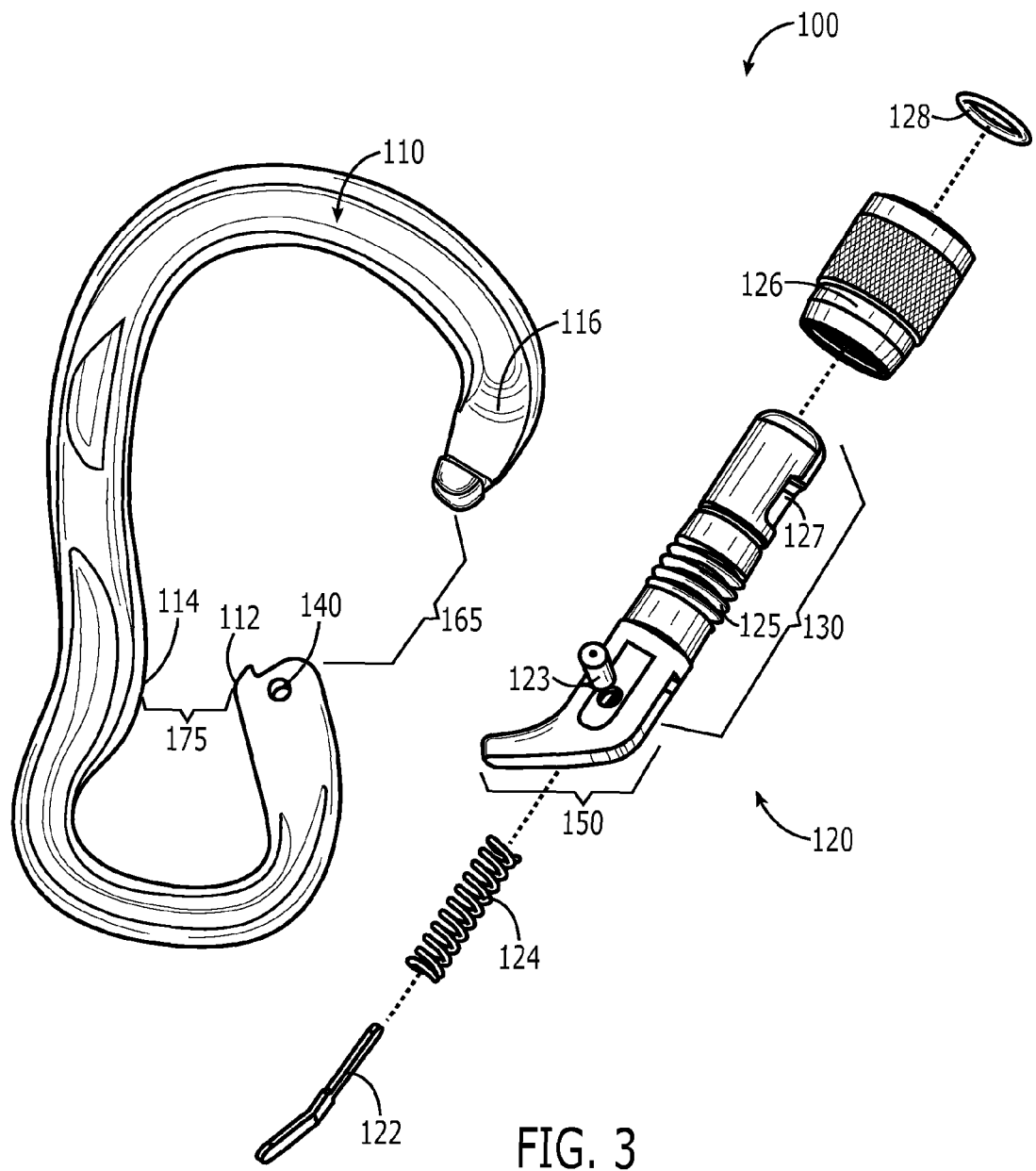
FIG. 3 illustrates a profile exploded view of the multi-chamber carabiner system of FIG. 1.
Figure 4:
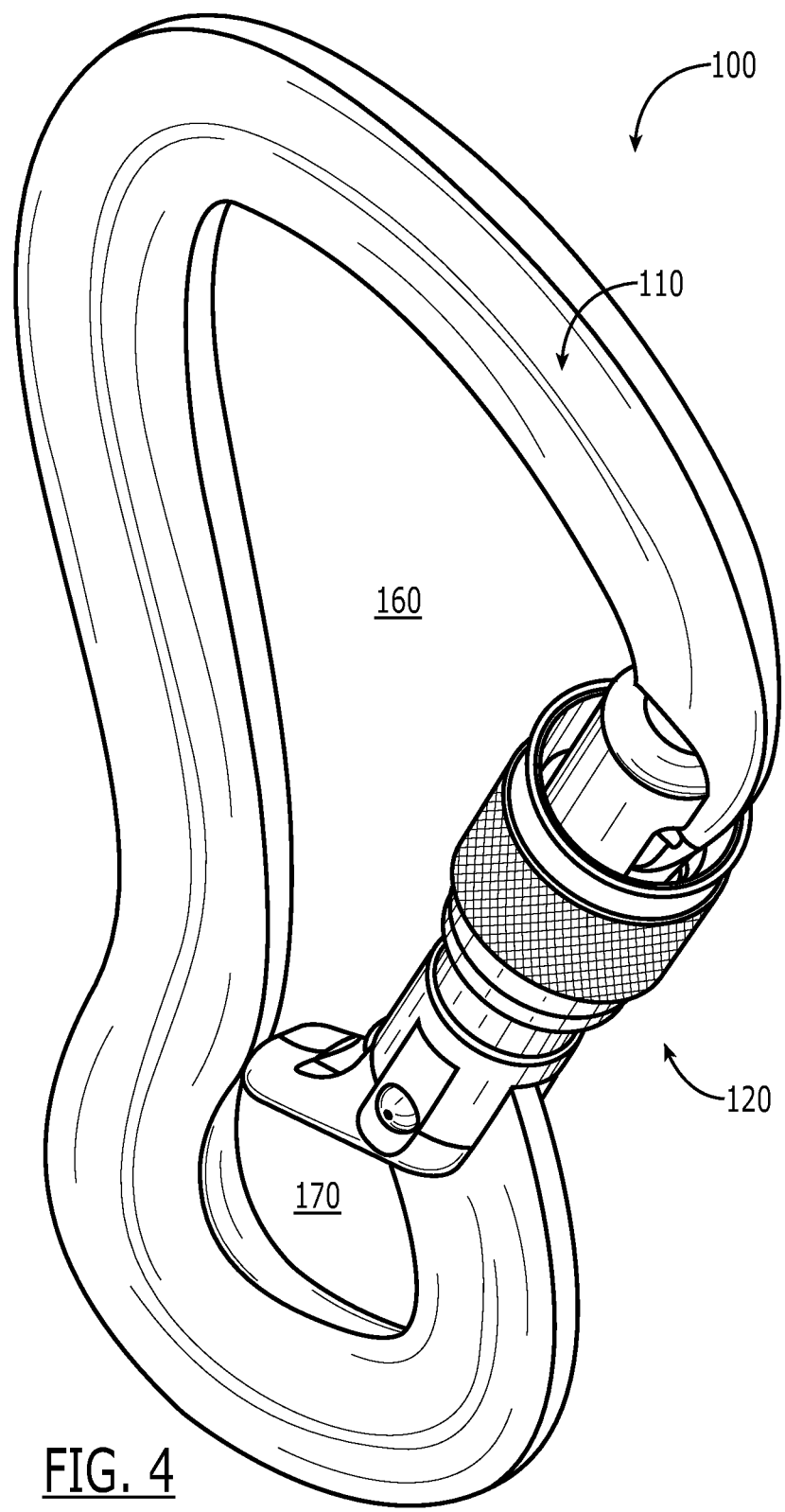
FIG. 4 illustrates a perspective view of the multi-chamber carabiner system of FIG. 1.

With specific reference to FIG. 3, the illustrated gate 120 further includes a notch 127, a pivot pin 123, a gate locking mechanism and a spring biasing system. The gate locking mechanism includes a female threaded region 125 on the primary gate portion 130, which is configured to selectively interface with a moveable sleeve 126 and O-ring 128. The moveable sleeve 126 includes a male threaded region on the interior and is oriented to translate in a lengthwise fashion along the primary gate portion 130. The gate locking mechanism includes an unlocked and locked configuration. The locked configuration corresponds to the gate locking mechanism impeding the gate 120 from pivoting with respect to the frame 110. The locked configuration also corresponds to the sleeve 126 being lengthwise positioned and/or translated away from the pivot point pin 123 along the threaded region 125 so as to at least partially extend over the notch 127. The unlocked configuration corresponds to the sleeve 126 being positioned and/or translated toward the pivot pin 123 along the threaded region 125 so as to not cover any portion of the notch 127. The spring biasing system includes a spring 124 and biasing member 122 coupled to the gate 120 to mechanically bias or urge the gate 120 toward the closed configuration. The spring biasing system simultaneously mechanically biases both the primary and secondary gate portions 150, 130 over the primary and secondary openings 165, 175 respectively. The spring 124 and biasing member 122 are disposed substantially within the gate 120 and frame 110 so as to prevent exposure to debris which may affect the mechanical bias force.

In operation, the gate 120 may be pivoted about the pivot point 140 on the frame 110 to selectively switch from the closed to open configurations of the system 100. The primary gate portion 130 and the secondary gate portion 150 simultaneously pivot about the pivot point 140 so as to simultaneously expose/open both the primary opening 165 and the secondary opening 175. Therefore, the illustrated primary and secondary gate portions 130, 150 are operationally dependent. The operational dependence of the primary and secondary gate portions 130, 150 further means that a single user motion may be utilized to translate a coupling point (i.e. harness belay loop) within the secondary enclosed region 170 via the primary and secondary openings 165, 175. The primary and secondary gate portions may alternatively be operationally independent so as to operate independently. For example, in an alternative embodiment, the primary and secondary gate portions still pivot about the common pivot point 140 but operate independently, requiring a user to manually pivot each gate portion in order to expose the respective opening. It will be appreciated that the common use of a single pivot point between the primary and secondary gate portions is a novel concept regardless of the operational independence or dependence of the primary and secondary gate portions.

Reference is next made to FIG. 2, which illustrates an operational schematic of the multi-chamber carabiner system 100 with reference to a belay device 180 and a harness 190 in accordance with one method of operation. The illustrated schematic is designed to illustrate one common attachment scheme or utilization of one embodiment of the present invention. It will be appreciated that numerous specific attachment schemes and methods of operation may be utilized in accordance with embodiments of the present invention. To attach the harness 190 to the system 100, the gate 120 is pivoted about the pivot location 140 of the frame 110 such that the primary portion is within a primary region of the at least one enclosed region and the secondary portion is within a secondary region of the at least one enclosed region; this state may also be referred to as the open configuration of the system 100. The harness 190 attachment point (i.e. belay loop) is inserted through the primary opening and within the primary region of the at least one enclosed region of the system. The harness belay loop is further inserted or translated through the secondary opening and within the secondary region of the at least one enclosed region. The gate 120 is then allowed to automatically pivot about the pivot location 140 of the frame causing the primary portion to extend across the primary opening and the secondary portion to extend across the secondary opening; this state may also be referred to as the closed configuration of the system 100. This process thereby secures the harness 190 attachment point within the secondary region of the system. A user may optionally attach the belay device 180 to the system by again pivoting the 120 about the pivot location 140 of the frame 110 to engage the open configuration of the system 100. The belay device 180 attachment point (i.e. cable) is inserted through the primary opening and within the primary region of the system 100. The gate 120 is then allowed to automatically pivot about the pivot location 140 of the frame 110 to the closed configuration of the system 100. It will be appreciated that a rope or safety line may also be coupled through the belay device 180 and coupled to the system 100 in accordance with standard belay techniques. The above described method therefore releasably attaches the belay device 180 and the harness 190 to the system 100 in separate enclosed regions. As a result, the separation of the primary and secondary enclosed regions within which the belay device 180 and the harness 190 are attached prevent cross-loading the system 100 during operation as described above. In addition, the above described method streamlines the necessary actions for routing the harness 190 and belay device 180 attachment points into separate regions of the multi-chamber system 100.

Figure 5:
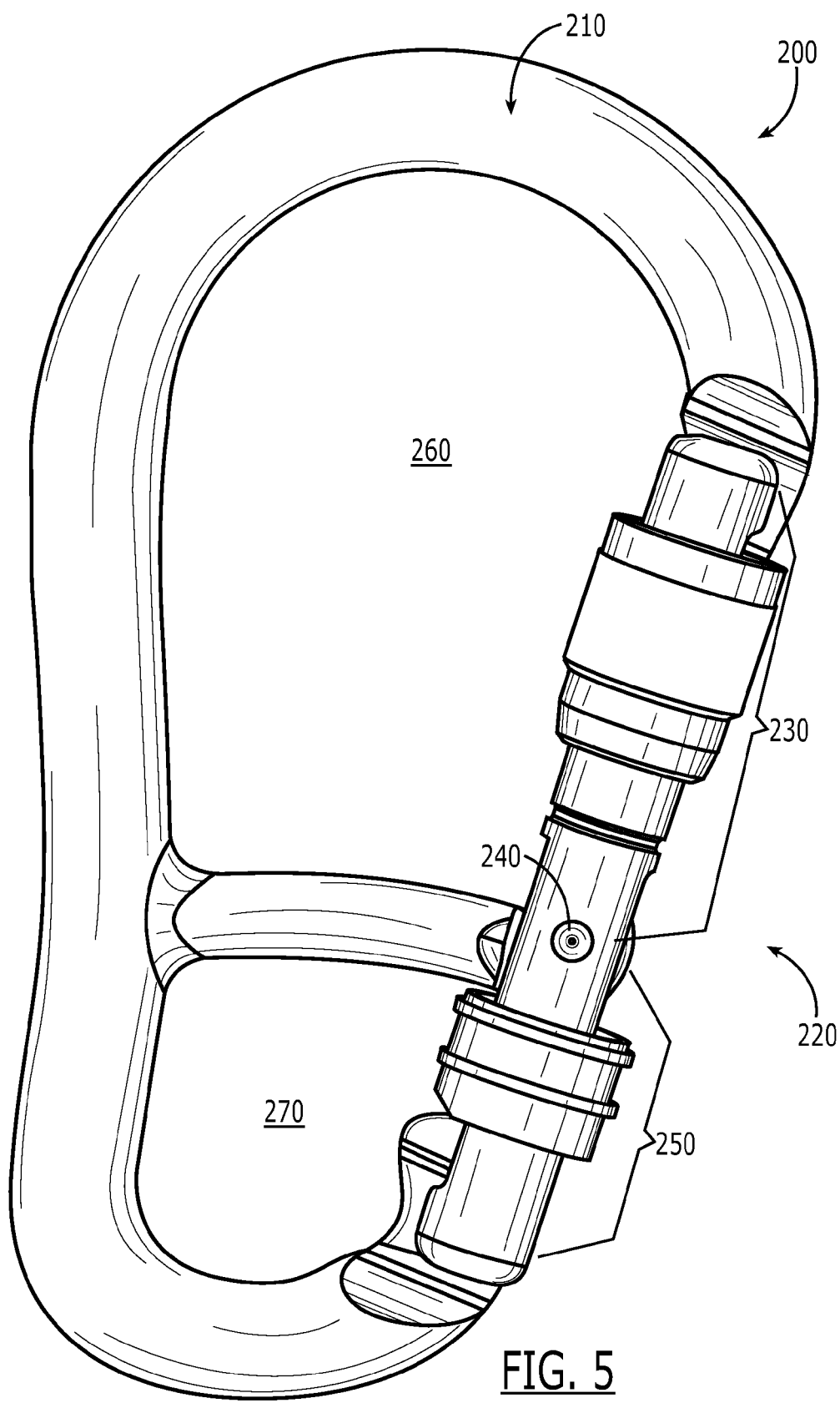
FIG. 5 illustrates a profile view of an alternative multi-chamber carabiner system.

Reference is next made to FIG. 5, which illustrates a profile view of an alternative multi-chamber carabiner system, designated generally at 200. The system 200 includes a frame 210, a gate 220, a primary inner region 260, and a secondary inner region 270. The gate 220 is pivotably coupled to the frame about a pivot point 240. The frame 210 forms a substantial two dimensional enclosure of the primary and secondary inner regions 260, 270. The gate 220 further includes a primary portion 530 and a secondary portion 250. The gate 220 and frame 210 are shown in a closed configuration such that the primary and secondary inner regions 260, 270 are continuously enclosed within the gate 220 and frame 210. The open configuration (not shown) corresponds to the primary and secondary portions 230, 250 of the gate 220 pivoting about the pivot point 240 so as to expose the primary inner region 260 and the secondary inner region 270. In this embodiment, the primary portion 230 is configured to pivot away from the primary inner region 260 while the secondary portion 250 is configured to simultaneously pivot within the secondary inner region 270 in the open configuration. In this embodiment, the primary portion 230 and secondary portion 250 are operably dependent meaning that the two respective gate portions move simultaneously during operation (i.e. selectively engaging the open or closed configuration). A gate biasing system (not designated) biases the gate 220 toward the closed configuration with respect to the frame 210. Various well known gate biasing systems may be used, including but not limited to those composed of springs, compliant materials, etc. The frame 510 forms the supportive structure of the system 200 and is shaped in a substantially concave manner with the respect to the gate 220. The exact curvature, shape, and composition of the frame 510 may be adjusted to modulate various other carabiner related performance aspects without affecting the teachings of the present invention. An analogous method of operation for the illustrated multi-chamber carabiner system 200 may include separately routing a harness attachment point within the secondary inner region 270 and a belay device attachment point within the primary inner region 260.

Figure 6A:
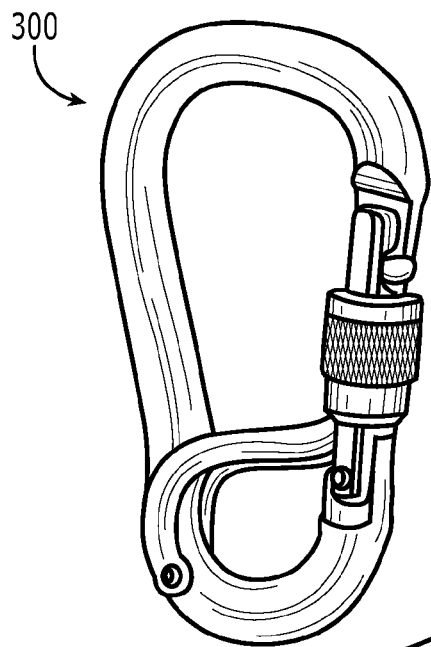
FIGS. 6A-F illustrate operational perspective and profile views of alternative multi-chamber carabiner systems.
Figure 6B:
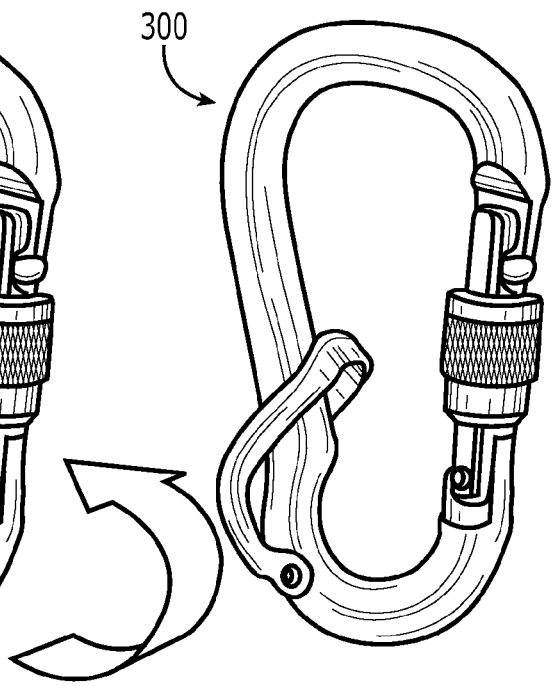
Figure 6C:
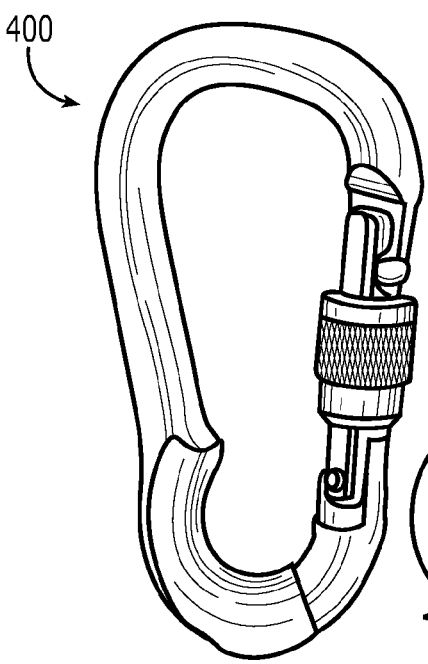
Figure 6D:
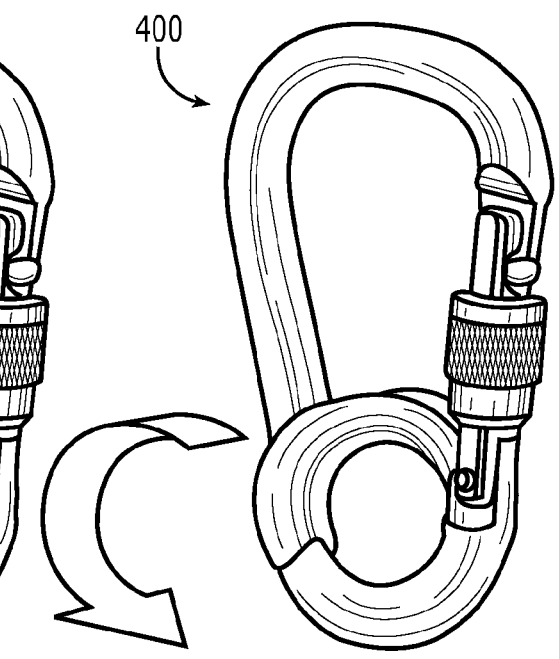
Figure 6E:
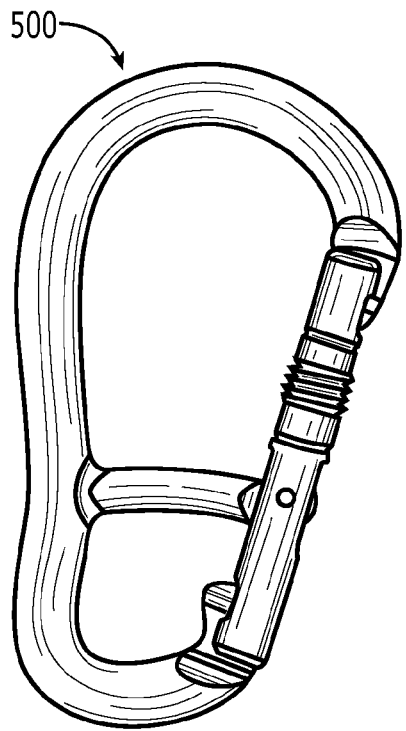
Figure 6F:
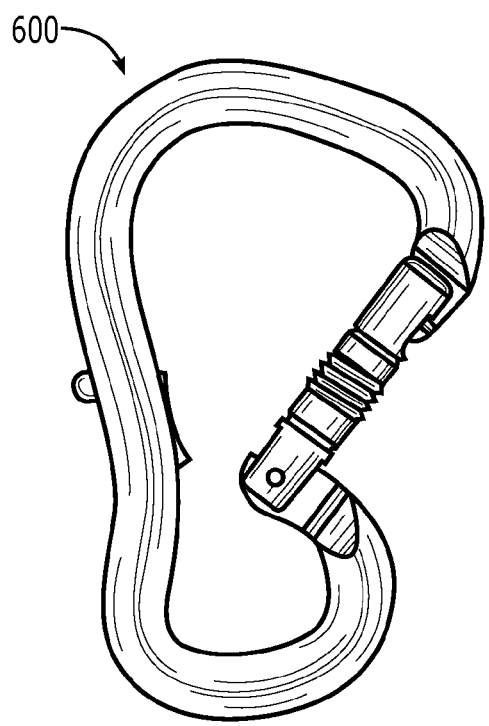

Reference is next made to FIGS. 6A-F, which illustrate operational perspective and profile views of alternative multi-chamber carabiner systems, respectively designated generally at 300, 400, 500, and 600. FIGS. 6A-6B illustrate an alternative multi-chamber carabiner system 300 in which the primary gate is in the closed configuration and the secondary gate is in the closed and open configurations, respectively. The system 300 includes separate primary and secondary gates that are operably independent of one another. In particular, the illustrated secondary gate of the system 300 pivots about an independent pivot location, is composed of an alternative material, and utilizes an independent biasing mechanism with respect to the primary gate. The illustrated secondary gate includes an open concave channel member configured to substantially conform to the frame in the open configuration (FIG. 6B). FIGS. 6C-6D illustrate another alternative multi-chamber carabiner system 400 in which the primary gate is in the closed configuration and the secondary gate is in the open and closed configurations, respectively. The system 400 also includes operationally independent primary and secondary gates which have independent pivot locations, alternative compositions, and separate biasing mechanisms. The secondary gate of the system 400 includes an enclosed concave channel member configured to substantially conform to the frame in the open configuration (FIG. 6C). FIG. 6E illustrates an alternative multi-chamber carabiner system 500 in which the primary gate is in the closed configuration and the secondary gate is in the closed configuration. The system 500 includes primary and secondary gates that are operationally dependent, have a common pivot location, are composed of a common material, but are configured to pivot in different orientations with respect to the frame. In addition, the system 500 includes primary and secondary inner regions that are rigidly separated by a portion of the frame, and therefore the only access to either the primary or secondary inner region is via the primary and secondary gate, respectively. FIG. 6F illustrates an alternative multi-chamber carabiner system 600 in which the primary gate is in the closed configuration and the secondary gate is in the open configuration. The illustrated system 600 includes separate primary and secondary gates that are operationally independent of one another. In particular, the illustrated secondary gate of the system 600 pivots about an independent pivot location, is composed of an alternative material, and utilizes an independent biasing mechanism with respect to the primary gate. The illustrated frame is specifically shaped to include a constriction or taper at the division between the primary and secondary inner regions. The illustrated secondary gate includes a small tab-shaped member configured to substantially conform to the length of the constriction/taper so as to selectively separate the primary and secondary inner regions.

It should be noted that various other multi-chamber carabiner systems may be practiced in accordance with the present invention, including one or more portions, combinations, and/or concepts of the embodiments illustrated in FIGS. 1-6. For example, a system may be practiced without a second inner region, with an alternative frame shape, with various material compositions, etc.

Various other embodiments have been contemplated, including combinations in whole or in part of the embodiments described above.

What is claimed is:

1. A multi-chamber carabiner configured for use as a belay carabiner comprising:
   a frame;
   a gate pivotably coupled about a pivot location to the frame;
   a closed configuration in which the gate and frame form at least one enclosed region;
   an open configuration in which the gate is pivotably rotated within the at least one enclosed region to form a first opening;
   a gate biasing system coupled to the frame and the gate, biasing the gate toward the closed configuration with respect to the frame; and
   wherein the frame includes a primary opening and a secondary opening, and wherein the gate includes a primary portion and a secondary portion, and wherein the primary portion of the gate extends from the pivot location across the primary opening of the frame in the closed configuration, and wherein the secondary portion extends from the pivot location across the secondary opening of the frame in the closed configuration; and
   wherein the primary and secondary portions of the gate are operably dependent so as to simultaneously pivot about the pivot location within the at least one enclosed region in the open configuration, and wherein the primary and secondary portions are elongated shaped regions extending from the pivot location, and wherein the secondary portion includes a length that is at least 150% of a width at the pivot location, and wherein the width extends across the pivot location to the at least one enclosed region.

2. The carabiner of claim 1, wherein the primary opening is on a perimeter region of the at least one enclosed region.

3. The carabiner of claim 1, wherein the secondary opening is within the at least one enclosed region.

4. The carabiner of claim 1, wherein the enclosed region includes two interior points of concavity across which the secondary opening extends.

5. The carabiner of claim 1, wherein the primary and secondary portions of the gate are lengthwise coupled at the pivot location.

6. The carabiner in claim 1, wherein the at least one enclosed region is a single region that includes a primary region and a secondary region, and wherein the secondary opening is between the primary and secondary regions of the at least one enclosed region, and wherein the primary region is larger than the secondary region.

7. The carabiner of claim 1, wherein the at least one enclosed region includes a separate primary and secondary enclosed region, and wherein the primary opening is disposed on the primary enclosed region and the secondary opening is disposed on the secondary enclosed region.

8. The carabiner of claim 1, wherein the primary gate portion includes a gate locking system configured to include an engaged state and a disengaged state, and wherein the engaged state corresponds to the gate and frame being locked in the closed configuration, and wherein the disengaged state corresponds to the gate being pivotably rotatable with respect to frame.

9. A multi-chamber carabiner configured for use as a belay carabiner comprising:
   a frame;
   a gate pivotably coupled to the frame about a pivot location;
   a closed configuration in which the gate extends from the pivot location across a primary opening of the frame to form at least one enclosed region;
   an open configuration in which the gate is pivotably rotated within the at least one enclosed region to form a first opening;
   a gate biasing system coupled to the frame and the gate, biasing the gate toward the closed configuration with respect to the frame; and
   a secondary gate pivotably coupled to the frame about the pivot location, wherein the at least one enclosed region includes a primary region and a secondary region, and wherein the frame includes a secondary opening between the primary region and the secondary region, and wherein the secondary gate extends across the secondary opening in the closed configuration, and wherein the secondary gate pivots about the pivot location within the secondary region in a secondary open configuration; and
   wherein the gate and secondary gate are operably dependent so as to simultaneously pivot about the pivot location within the at least one enclosed region in the open configuration, and wherein the gate and secondary gate are elongated shaped members extending from the pivot location, and wherein the secondary portion includes a length that is at least 150% of a width at the pivot location, and wherein the width extends across the pivot location to the at least one enclosed region.

10. The carabiner of claim 9, wherein the primary opening is on a perimeter region of the at least one enclosed region.

11. The carabiner of claim 9, wherein the gate includes a gate locking system configured to include an engaged state and a disengaged state, and wherein the engaged state corresponds to the gate and frame being locked in the closed configuration, and wherein the disengaged state corresponds to the gate being pivotably rotatable with respect to frame.

12. A method for engaging a carabiner with a harness for rock climbing activities, comprising the acts of:
   providing a harness including a harness belay loop;
   providing a belay carabiner including a frame and a gate, wherein a primary portion and a secondary portion of the gate are operationally dependent and extend from a pivot location on the frame across a primary opening and a secondary opening respectively to form at least one enclosed region, and wherein the primary and secondary portions are elongated shaped regions extending from the pivot location, and wherein the secondary portion includes a length that is at least 150% of a width at the pivot location, and wherein the width extends across the pivot location to the at least one enclosed region;
   pivoting the gate about the pivot location of the frame such that the primary portion is within a primary region of the at least one enclosed region and the secondary portion is within a secondary region of the at least one enclosed region;
   inserting the harness belay loop through the primary opening and within the primary region of the at least one enclosed region;
   inserting the harness belay loop through the secondary opening and within the secondary region of the at least one enclosed region; and
   pivoting the gate about the pivot location of the frame causing the primary portion to extend across the primary opening and the secondary portion to extend across the secondary opening.

13. The method of claim 12 further including the acts of:
   providing a belay device;
   pivoting the gate about the pivot location of the frame such that the primary portion is within a primary region of the at least one enclosed region and the secondary portion is within a secondary region of the at least one enclosed region; and
   inserting the belay device through the primary opening and within the primary region of the at least one enclosed region.

* * * * *